United States Patent [19]

Williford

[11] Patent Number: 5,572,187
[45] Date of Patent: Nov. 5, 1996

[54] AIR BRAKE MONITORING AND SAFETY SYSTEM

[76] Inventor: Robert F. Williford, 7211 Crane Ave., Apt. 33, Jacksonville, Fla. 32211

[21] Appl. No.: 247,300

[22] Filed: May 23, 1994

[51] Int. Cl.$^6$ .................. B60Q 1/00; B60T 13/00
[52] U.S. Cl. .................. 340/454; 340/451; 340/452; 340/453; 340/522; 188/1.11; 303/3; 303/9.63; 303/22.4
[58] Field of Search .................. 340/454, 451, 340/452, 453, 450.1, 525, 517, 521, 522; 188/1.11; 303/1, 2, 3, 4, 9.63, 22.4

[56] References Cited

U.S. PATENT DOCUMENTS

| | | | |
|---|---|---|---|
| 3,298,466 | 1/1967 | Ayers et al. | |
| 3,339,676 | 9/1967 | Quinn | 118/1 |
| 3,652,985 | 3/1972 | Toshioka et al. | 340/452 |
| 3,997,887 | 12/1976 | Poynter | 340/453 |
| 4,025,781 | 5/1977 | Brearley | 340/452 |
| 4,279,214 | 7/1981 | Thorn | 116/208 |
| 4,583,071 | 4/1986 | Sebalos et al. | 340/52 B |
| 4,727,353 | 2/1988 | Ruhter | 340/525 |
| 4,757,300 | 7/1988 | Sebalos | 340/52 B |
| 4,800,991 | 1/1989 | Miller | 188/1.11 |
| 5,043,700 | 8/1991 | Rymut | 340/517 |
| 5,206,625 | 4/1993 | Davis | 340/454 |
| 5,207,299 | 5/1993 | Feldman | 188/79.55 |
| 5,226,509 | 7/1993 | Smith | 188/1.11 |
| 5,285,190 | 2/1994 | Humphreys et al. | 340/454 |
| 5,394,137 | 2/1995 | Orschek | 340/453 |

*Primary Examiner*—Donnie L. Crosland
*Attorney, Agent, or Firm*—Arthur G. Yeager

[57] ABSTRACT

A monitoring and safety system for air-operated parking brakes and foot brakes on a vehicle employs electric contacts to provide alarms when movement of the actuators occurs in a manner indicative of failure or malfunction in the actuators or in the brakes themselves. The system also includes a number of air pressure sensors for monitoring and alarm functions. In addition, parking brake air pressure is monitored for purpose of overriding a movement sensor alarm when air pressure in the actuator indicates that the vehicle is parked.

15 Claims, 4 Drawing Sheets

AIR BRAKE MONITORING AND SAFETY SYSTEM

BACKGROUND OF THE INVENTION

1. Field of the Invention

The present invention relates to monitoring systems for vehicle air brake systems for both parking brakes and foot brakes.

2. Prior Art

There are a wide variety of monitoring systems for air brakes and associated actuator assemblies with particular attention being directed to brake adjustment.

Virtually all braking systems experience wear during use, with that wear in turn causing a certain amount of free play in the brake mechanism which reduces stopping ability of the vehicle. Such free play requires some form of periodic manual or automatic adjustment of the brake mechanism in order to have the brakes operating at or near peak efficiency. Conventional passenger cars have hydraulic systems that are monitored and adjusted by automatic systems. Hydraulic brake systems which lack such adjustment features still provide the driver with a fairly good indication that brake adjustment is required in the form of excessive brake pedal travel.

Hydraulic braking systems, even of the power assist variety, are not adequate on larger vehicles such as buses, large trucks and tractor trailers. Such larger vehicles commonly employ air brakes where brake pedal activation controls a valve that releases compressed air from a storage tank. With such air brake systems, pedal travel is no longer reliable for determining the need for brake adjustment, as the air is compressable. Automatic brake adjusting schemes are available for larger vehicle air brake systems, but failure of these mechanisms can occur without the operator knowing of such failure until an accident occurs. Such a failure problem is compounded by relying entirely on the automatic adjusting devices by the operator. Further insight into the nature and severity of this problem may be found in the article entitled "The Importance of Maintaining Air Brake Adjustment" authored by Radlinski, Williams, and Machey, published as a Society of Automotive Engineers Technical Paper Series in 1982. Briefly this paper points out that something on the order of fifteen percent (15%) of the air braked vehicles on the road are in an unsafe condition due to brake misadjustment. This article concludes with a number of suggestions to improve the brake adjustment situation.

In addition to brake adjustment issues there are also important concerns regarding component overtravel and/or failure in a manner that will prevent proper brake operation. Merely knowing the brakes are out of adjustment does not indicate other possible problems with the brakes. The prior art brake adjustment indicating devices do not indicate other problems that may be associated with the brakes and Actuator Assemblies. See for example U.S. Pat. Nos. 5,226,509; 5,207,299; 5,206,625; 4,800,991; 4,757,300; 4,583,071; 4,279,214; 3,997,887; 3,339,676; and 3,298,466.

SUMMARY OF THE INVENTION

In one aspect of the present invention there is provided an air brake monitoring and safety system for monitoring the operation of an air brake system of a vehicle including parking brakes and foot brakes for providing indication of the failure or eminent failure of selected components. A first sensor means is operably connected to an air operated parking brake actuator and responsive to movement of the actuator for providing a first output signal when the parking brake actuator moves in a predetermined manner as established by the first sensor means, first alarm circuit means having an alarm within a driver's compartment of a vehicle operably connected to the first sensor means and responsive to the first output signal for providing a first alarm output signal in response to the first output signal. A second sensor means is responsive to the air pressure in the parking brake actuator for providing a second output signal when the air pressure in the parking brake actuator is less than a first value, as established by the second sensor means, and the second sensor means blocks the first output signal when the air pressure in the parking brake actuator is less than the first value.

The invention also includes third and fourth sensor means responsive to the air pressure in the parking brake actuator for providing respective third and fourth output signals when the air pressure in the parking brake actuator is less than corresponding second and third values as determined by respective third and fourth sensor means. A second alarm circuit means is responsive to the third output signal for providing a second alarm output signal in response thereto. The fourth sensor means blocks the third output signal when the air pressure in the parking brake actuator is less than the third value. There is also a sensor means for measuring the air pressure in the parking brake actuator and providing visual indication of the measured air pressure.

In another aspect of the present invention, a third sensor means is operably connected to an air operated foot brake actuator and responsive to movement thereof for providing a third output signal when the foot brake actuator moves a predetermined distance as established by the third sensor means. A second alarm circuit means is operably connected to the third sensor means and responsive to the third output signal for providing a second alarm output signal in response thereto. The first sensor means includes first and second contact means, one contact means being operably connected to a first component of the parking brake actuator that is movable when the parking brake actuator is operated to operate a parking brake, the first sensor means further including first electric circuit means for providing the first output signal in response to opening between the first and second contacts. One contact means is affixed to the first component, the first component being movable in response to movement of a diaphragm of the parking brake actuator that is movable in a first direction a first predetermined distance by a spring means to set a parking brake and movable in a second direction a second predetermined distance by air pressure to release a parking brake, the first and second contacts being in contact when the parking brake actuator is operated to release a parking brake, the contacts being opened when air pressure applied to the diaphragm is insufficient to overcome the resistance resulting from the spring means thereby resulting in movement of the diaphragm in response to the spring means a distance less than the first predetermined distance. The system also includes sensor means for measuring the air pressure in each parking brake actuator and providing visual indication of the measured air pressure.

The system includes a pair of third sensor means operably connected to a pair of air operated foot brake actuators and responsive to movement thereof for providing a pair of third output signals when the respective foot brake actuator moves a predetermined distance as established by respective third sensor means, a pair of second alarm circuit means operably connected to respective third sensor means and responsive to either third output signal for providing a second alarm output signal in response thereto.

In another aspect of the invention there is provided a front pair and rear pair of foot brakes for providing indication of the malfunction of selected components therein comprising first sensor means operably connected to each air operated foot brake actuator and responsive to movement thereof for providing a first output signal when the corresponding foot brake actuator moves a predetermined distance as established by respective first sensor means. A first alarm circuit means includes an alarm within a driver's compartment of a vehicle operably connected to each first sensor means and responsive to respective first output signal for providing a first alarm output signal in response to either first output signal. Each of the first sensor means includes first and second contact means, one contact means being operably connected to a first component of the foot brake actuator that is movable when the foot brake actuator is operated to operate a foot brake, the movement of the component being of a predetermined manner in response to a malfunction of the foot brake actuator or the foot brake. Each of the first sensor means further including first electric circuit means for providing respective first output signal in response to contact between first and second contacts, when the first component has moved in the predetermined manner.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE PREFERRED EMBODIMENT

Figure 1:
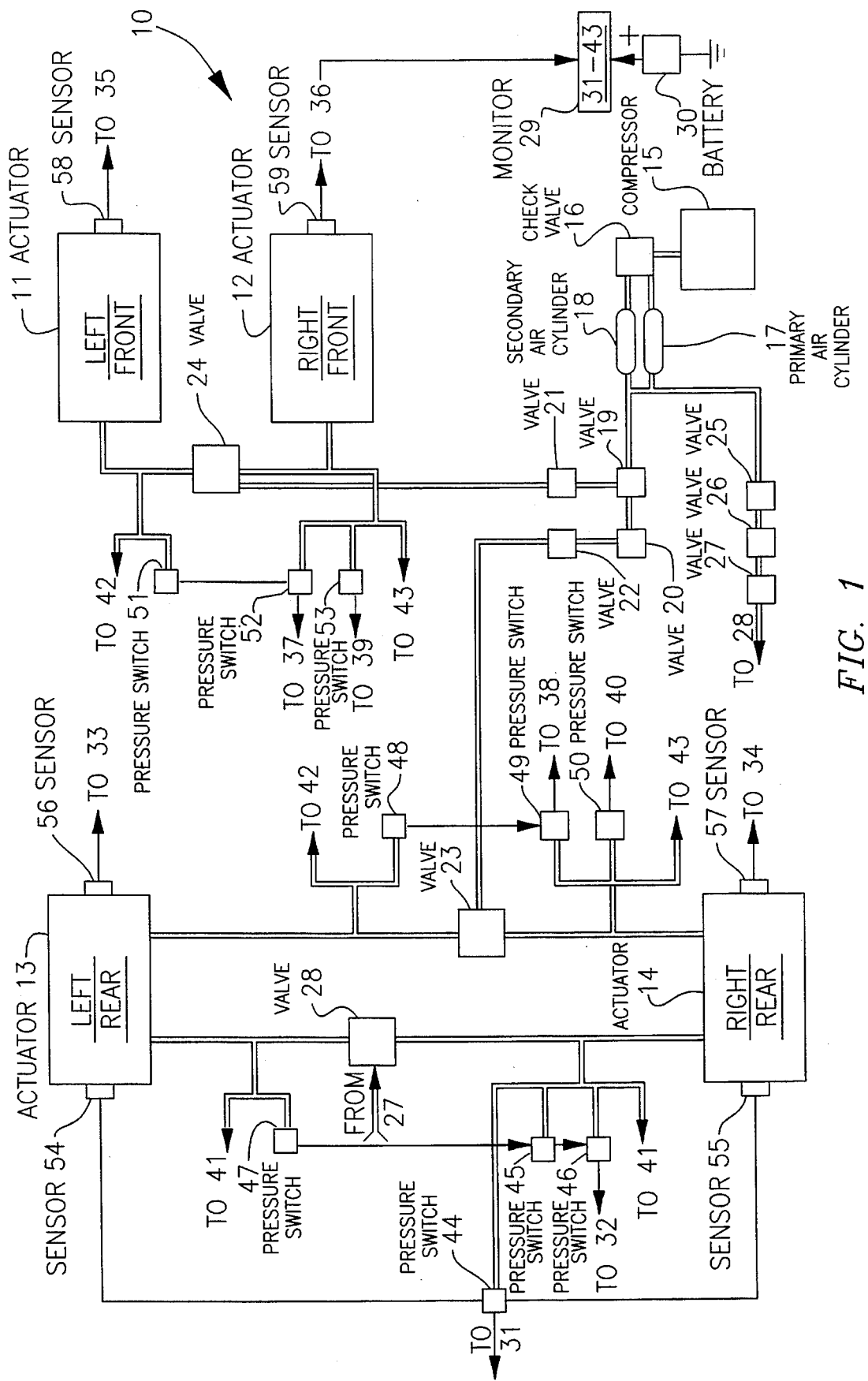
FIG. 1 is a pictorial diagram of a vehicle air brake system and the monitoring and safety system in accord with the present invention.

With reference now to the drawings, the air brake safety system in accord with the present invention is depicted generally by numeral 10. Four air brake actuator assemblies, 11, 12, 13, and 14 are installed on a vehicle employing air brakes as understood in the art. The air system is shown simplified and includes air compressor 15 which supplies 120–150 psi air pressure to the system via a check valve 16 and two air cylinders, a primary 17 and a secondary 18, connected in parallel. Foot brake pedal 19 controls air flow to three foot brake relay valves 20, 21 and 22 which in turn supply air to two foot brake quick release valves 23 and 24 to the actuators 11–14. The air system also supplies air via parking brake actuator 25, relief valve 26 and parking brake relay valve 27 to parking brake quick release valve 28. The equipment, valve arrangement, and number of brakes may vary with the manufacturer and the vehicle as understood in the art. Monitor 29 is installed in the cab of a vehicle within view of the driver and is powered via the vehicle battery 30 or its own internal power source. The electrical connections in the system operate on a continuity-seeking basis. The positive terminal is connected to lights, audible alarms and gauges in monitor 29. The switches and sensors in the system operate by opening or closing a connection to negative ground.

Figure 2:
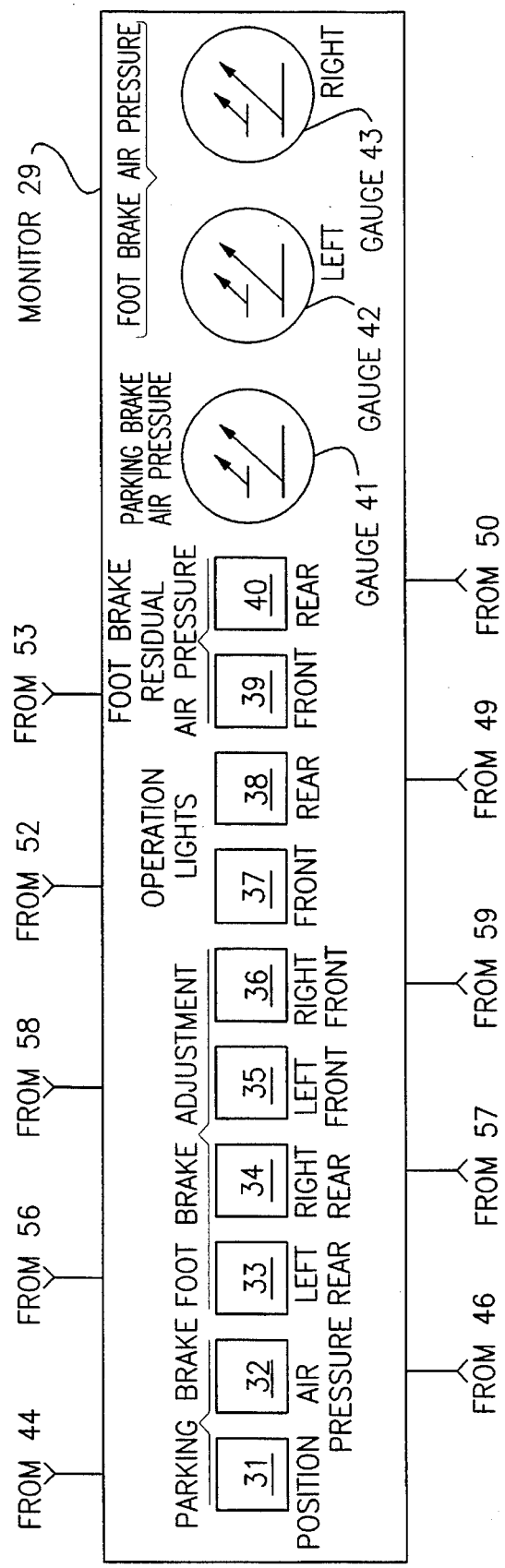
FIG. 2 is a diagram of the monitoring and alarm panel in accord with the present invention.

The monitor 29 is shown in greater detail in FIG. 2. Parking brake position alarm light 31 is energized by way of a sensor 54, 55 (FIG. 1) when the parking brake actuator apparatus has moved in a manner to indicate a malfunction such as air loss as will be discussed hereinbelow. Parking brake air pressure light 32 is energized when air pressure drops below 65 lbs. in the parking brake cylinder as detected by switch 45. This alarm will be deenergized when pressure drops below 3 lbs. via 3 lb. pressure switch 46 which is in electric series with switch 45 as an indication that the vehicle is parked. The foot brake adjustment alarms 33–36 are energized by sensors 56–59 for a corresponding brake when the actuator moves an excessive distance. Yellow operation lights 37, 38 respond to 65 lb. pressure switches during brake operation and indicate that the system is activated, air pressure is normal during normal stopping conditions, the brakes have not been applied in a hard stopping manner or other brake malfunction, for example, overheating of the brake shoes and drums, wet conditions or grease seal leakage. Blue foot brake residual air pressure lights 39, 40, are energized via 3 lb. pressure switches in the event of bleedover of air into the foot brake air chamber 79 due to any leakage or failure/leakage in any valve, such as relays and regulators, and the like.

Parking brake air pressure gauge 41 is a dual gauge that monitors residual air line pressure in the parking brake chambers 61. Foot brake air pressure gauges 42, 43 are each dual gauges that each display front and rear air system pressure at foot brake chamber 79.

Figure 3:
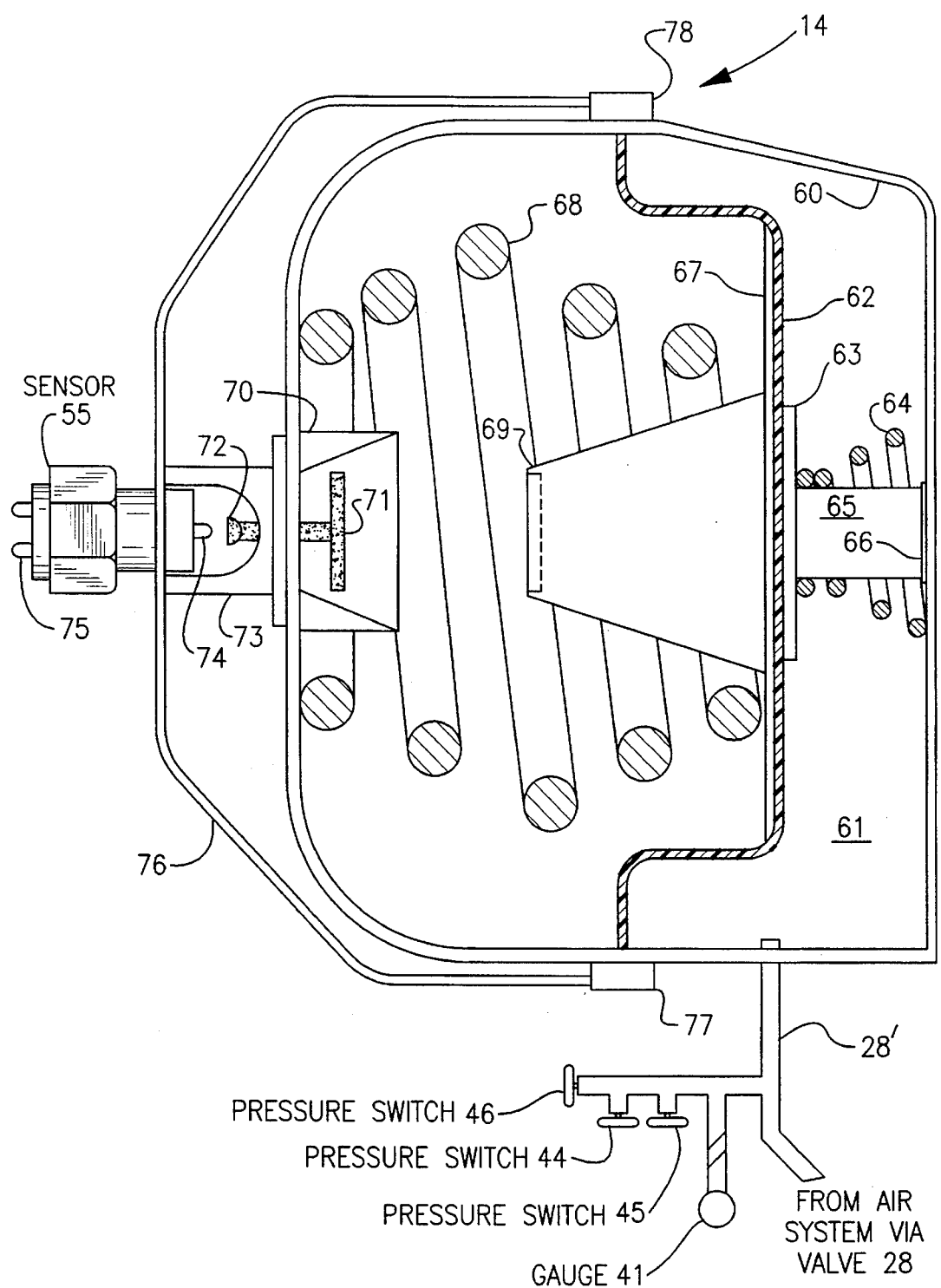
FIG. 3 is a simplified side cross-sectional view of a parking brake actuator.
Figure 4:
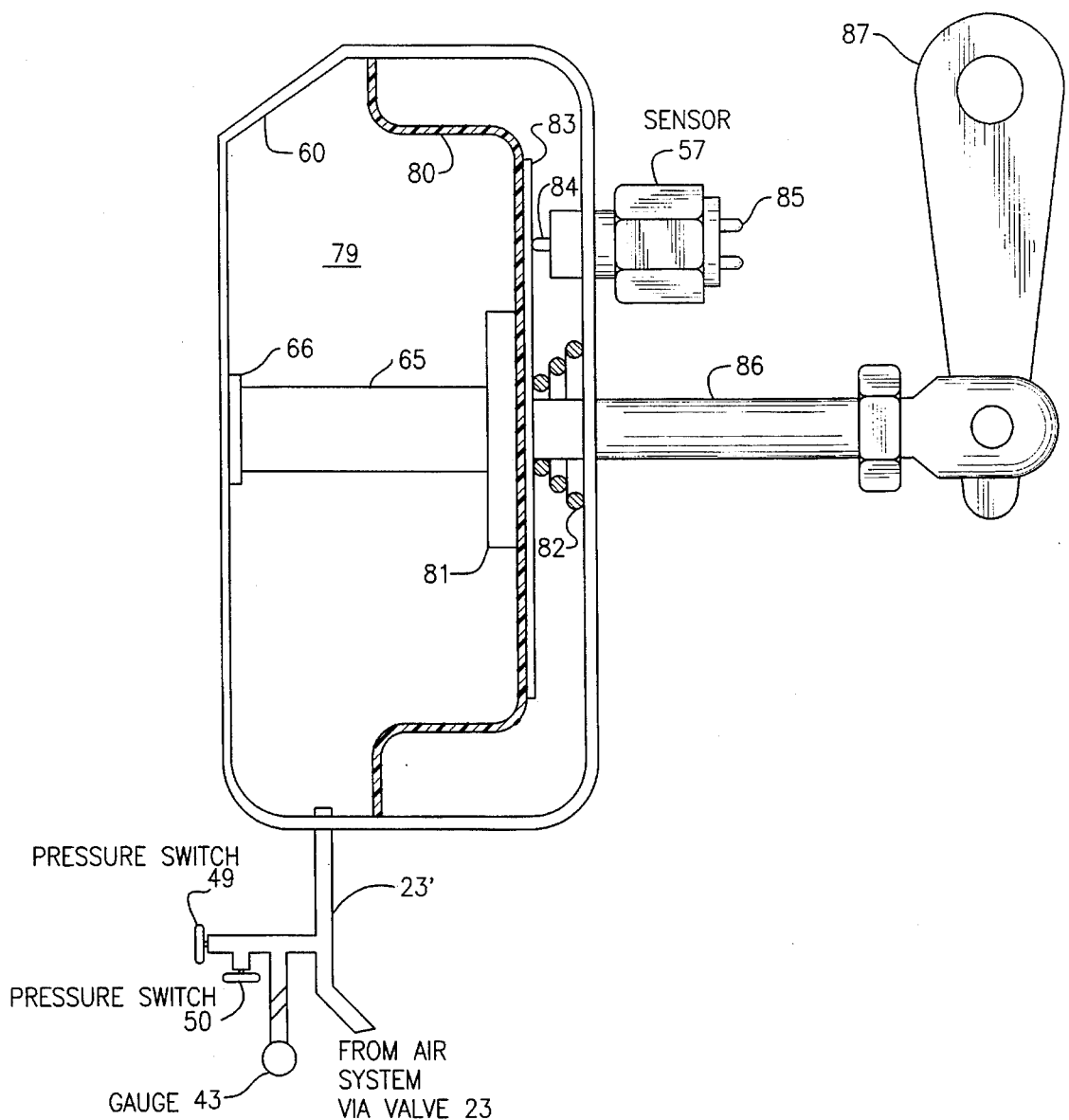
FIG. 4 is a simplified side cross-sectional view of a foot brake actuator.

With reference now to FIGS. 1, 3 and 4, a rear actuator 14 is illustrated in a simplified diagrammatic form with parking brake on and foot brake out of adjustment. Housing 60 defines the parking brake air chamber 61. Diaphragm 62 has a plate 63 upon which rests return spring 64 around push rod 65. Chamber seal 66 prevents air bleedover from chamber 61 into chamber 79. Diaphragm plate 67 has an extension portion 69 extending laterally and inside brake coil spring 68. Extension guide 70 provides support for actuator 71 that is movable when in contact with extension portion 69. Actuator contact surface 72 closes an electric circuit when in contact with sensor contact 74. Plug 75 provides the electrical connection from battery 30. Housing plate 76 is removably attached to posts 77, 78. The sensor 55 is positioned where the insert to release the parking brake (for towing) is normally placed.

Sensors 54 and 55 are wired in electrical parallel and are in series with 3 lb. pressure switch 44. Loss of contact between sensor actuator 71 and sensor contact 74 will close the sensor circuit 54 or 55 and actuate the alarm light 31. During normal operation of the vehicle contact will be lost between the actuator 71 and contact 74 only as a result of movement of diaphragm plate 67. This in turn indicates a malfunction such as loss of air pressure. When the parking brake is actuated on, contact will be lost but 3 lb. pressure switch 44 will open blocking alarm 31 activation to indicate that the vehicle is parked.

In FIG. 4, the foot brake air chamber 79 is defined by housing 60. Diaphragm 80 has a plate 83 to support return spring 82 and is shown in contact with push rod end plate 81. Sensor contact 84 and plug 85 are part of sensor 57. Brake operating rod 86 is attached to slack adjuster 87.

Plate 83 and contact 84 are shown in contact because of the excessive travel distance of diaphragm 80 due to, among other things, the brake being out of adjustment. As understood in the art, slack adjuster 87 is used to accommodate for brake wear over a given wear range. In addition to the brake being out of adjustment however, other problems can be indicated by excessive travel of foot brake diaphragm 80. These are (1) slack adjuster 87 failure and (2) mounting assembly failure. Further, most air brakes employ an "S-cam" as part of the brake operating system and accordingly, S-cam shaft failure or S-cam "flipover", a form of excessive rotation, will be indicated by diaphragm 80 over travel. Foot brake adjustment lights 33–36 will be energized by the respective sensors 56–59 to indicate malfunction in the foot brake operation.

Air pressure switch 45 monitors the air pressure available for parking brake release. Switch 45 is in electrical series with a 3 lb. air pressure switch 46. If air pressure drops below 65 psi, brake pressure alarm light 32 is energized indicating a malfunction with the air system or the parking brake itself. If pressure drops below 3 psi the brake pressure alarm 32 will be deenergized as the pressure is such that it indicates the vehicle is parked. Accordingly, the alarm 32 acts as an early warning indicator of possible problems, such as movement of the parking brake, with the parking brake system. Independently, sensor 55 will provide an indication to parking brake position indicator 31 if contact is lost between actuator 71 and contact 74. This can result from a sensor failure itself in addition to diaphragm 62 movement. Air pressure switch 44 will deenergize brake position alarm 31 when pressure drops below 3 psi as is the case when the parking brake is on and the vehicle is parked.

Air pressure switch 47 monitors air pressure in the air line to the left rear actuator 13 and is in electrical series with switch 45 so that alarm 32 is energized if air pressure to either rear parking brake is lost.

Air pressure switches 48 and 49 monitor foot brake air pressure on either side of valve 23 and provide indication to rear operation light 38 during normal operation of the foot brakes. The switches are in electrical series. Similarly, air pressure switches 51 and 52 monitor foot brake air pressure to front brake actuators 11 and 12 and operate the front operation light 37 during normal operation of the front foot brakes.

Residual air pressure switches 50 and 53 monitor foot brake air chambers 79 and will detect bleedover via seal 66 and similar problems if they arise. They energize lights 40 and 39 respectively if pressure exceeds 3 psi due to valve leakage as mentioned hereinabove.

Accordingly, the present invention provides for brake adjustment warnings and for indication of those types of component failures or system malfunctions that can be indicated by travel of the brake actuator in a particular manner.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An air brake monitoring and safety system for monitoring the operation of an air brake system of a vehicle, the air brake system including parking and foot brakes, and for providing indication of the operation of the air brake system, the monitoring and safety system comprising first sensor means operably connected to each air operated parking brake actuator in said air brake system and responsive to movement thereof for providing a first output signal when respective said parking brake actuator moves in a predetermined manner as established by said first sensor means, first alarm circuit means having an alarm within a driver's compartment of a vehicle operably connected to each said first sensor means and responsive to each said first output signal for providing a first alarm output signal in response to a respective said first output signal, second sensor means responsive to the air pressure in each said parking brake actuator for providing a second output signal when the air pressure in any said parking brake actuator is less than a first value as established by each said second sensor means said second sensor means blocks a corresponding said first output signal when air pressure in a corresponding said parking brake actuator is less than said first value.

2. The system as defined in claim 1 further including third and fourth sensor means responsive to air pressure in each said parking brake actuator for providing respective third and fourth output signals when the air pressure in any said parking brake actuator is less than corresponding second and third values as determined by respective third and fourth sensor means, second alarm circuit means responsive to any said third output signal for providing a second alarm output signal in response thereto, said fourth sensor means blocking a corresponding said third output signal when air pressure in a corresponding said parking brake actuator is less than said third value.

3. The system as defined in claim 1 further including third sensor means for measuring air pressure in each said parking brake actuator and providing visual indication of measured air pressure.

4. The system as defined in claim 1 further including third sensor means operably connected to an air operated foot brake actuator and responsive to movement thereof for providing a third output signal when said foot brake actuator moves a predetermined distance as established by said third sensor means, second alarm circuit means operably connected to said third sensor means and responsive to said third output signal for providing a second alarm output signal in response thereto.

5. In the system as defined in claim 1 wherein said first sensor means includes first and second contact means, one said contact means being operably connected to a first component of said parking brake actuator that is movable when said parking brake actuator is operated to operate a parking brake, said first sensor means further including first electric circuit means for providing said first output signal in response to opening between said first and second contacts.

6. An air brake monitoring and safety system for monitoring the operation of an air brake system of a vehicle including parking brakes and foot brakes for providing indication of brake failure comprising a pair of first sensor means operably connected to a pair of air operated parking brake actuators and responsive to movement thereof for providing a respective pair of first output signals when the corresponding said parking brake actuator moves in a predetermined manner as established by respective said first sensor means, first alarm circuit means having an alarm within a driver's compartment of a vehicle operably connected to both said first sensor means and responsive to said first output signal for providing a first alarm output signal in response to either of said first output signals, second sensor means responsive to the air pressure in one said parking brake actuator for providing a second output signal when the air pressure in said one parking brake actuator is less than a first value as established by said second sensor means a third and fourth sensor means responsive to the air pressure in both of said parking brake actuators for providing respective third and fourth output signals when the air pressure in the respective said parking brake actuator is less than corresponding second and third values as determined by respective third and fourth sensor means, second alarm circuit means responsive to both said third output signal for providing a second alarm output signal in response to either said third output signal, said fourth sensor means blocking both said third output signal when the air pressure in the one said parking brake actuator is less than said third value.

7. An air brake monitoring and safety system for monitoring the operation of an air brake system of a vehicle, the air brake system including parking and foot brakes, and for providing indication of the operation of the air brake system, the monitoring and safety system comprising first sensor means operably connected to each air operated parking brake actuator in said air brake system and responsive to movement thereof for providing a first output signal when respective said parking brake actuator moves in a predetermined manner as established by said first sensor means, first alarm circuit means having an alarm within a driver's compartment of a vehicle operably connected to each said first sensor means and responsive to each said first output signal for providing a first alarm output signal in response to a respective said first output signal, second sensor means responsive to the air pressure in each said parking brake actuator for providing a second output signal when the air pressure in any said parking brake actuator is less than a first value as established by each said second sensor means, said first sensor means including first and second contact means, one said contact means being operably connected to a first component of said parking brake actuator that is movable when said parking brake actuator is operated to operate a parking brake, said first sensor means further including first electric circuit means for providing said first output signal in response to opening between said first and second contacts, said one contact means is affixed to the first component, the first component being movable in response to movement of a diaphragm of said parking brake actuator that is movable in a first direction a first predetermined distance by a spring means to set a parking brake and movable in a second direction a second predetermined distance by air pressure to release a parking brake, said first and second contacts being in contact when said parking brake actuator is operated to release a parking brake, said contacts being opened when air pressure applied to said diaphragm is insufficient to overcome the resistance resulting from said spring means thereby resulting in movement of said diaphragm in response to said spring means a distance less than said first predetermined distance.

8. An air brake monitoring and safety system for monitoring the operation of an air brake system of a vehicle including parking brakes and foot brakes for providing indication of brake failure comprising a pair of first sensor means operably connected to a pair of air operated parking brake actuators and responsive to movement thereof for providing a respective pair of first output signals when the corresponding said parking brake actuator moves in a predetermined manner as established by respective said first sensor means, first alarm circuit means having an alarm within a driver's compartment of a vehicle operably connected to both said first sensor means and responsive to said first output signal for providing a first alarm output signal in response to either of said first output signals, second sensor means responsive to the air pressure in one said parking brake actuator for providing a second output signal when the air pressure in said one parking brake actuator is less than a first value as established by said second sensor means, said second sensor means blocking both said first output signals when the air pressure in said one parking brake actuator is less than said first value.

9. The system as defined in claim 8 said sensing means further includes third and fourth sensor means responsive to the air pressure in both of said parking brake actuators for providing respective third and fourth output signals when the air pressure in the respective said parking brake actuator is less than corresponding second and third values as determined by respective third and fourth sensor means, second alarm circuit means responsive to both said third output signal for providing a second alarm output signal in response to either said third output signal, said fourth sensor means blocking both said third output signals when the air pressure in the one said parking brake actuator is less than said third value.

10. The system as defined in claim 9 further comprising a pair of fifth sensor means operably connected to a pair of air operated foot brake actuators and responsive to movement thereof for providing a pair of third output signals when the respective said foot brake actuator moves a predetermined distance as established by respective said fifth sensor means, a pair of second alarm circuit means operably connected to respective said fifth sensor means and responsive to either said third output signal for providing a second alarm output signal in response thereto.

11. The system of claim 8 wherein said second sensor means blocks both said first output signals when the air pressure in the one said parking brake actuator is less than said first value.

12. The system as defined in claim 8 further including third sensor means for measuring the air pressure in each said parking brake actuator and providing visual indication of the measured air pressure.

13. The system as defined in claim 8 further including a pair of third sensor means operably connected to a pair of said air operated foot brake actuators and responsive to movement thereof for providing a pair of third output signals when the respective said foot brake actuator moves a predetermined distance as established by respective said third sensor means, a pair of second alarm circuit means operably connected to respective said third sensor means and responsive to either said third output signal for providing a second alarm output signal in response thereto.

14. In the system as defined in claim 8 wherein each said first sensor means includes first and second contact means, one said contact means being operably connected to a first component of the respective said parking brake actuator that is movable when the said parking brake actuator is operated to operate a corresponding said parking brake, each said first sensor means further including first electric circuit means for providing said first output signal in response to opening between said first and second contacts.

15. An air brake monitoring and safety system for monitoring the operation of an air brake system of a vehicle including parking brakes and foot brakes for providing indication of brake failure comprising a pair of first sensor means operably connected to a pair of air operated parking brake actuators and responsive to movement thereof for providing a respective pair of first output signals when the corresponding said parking brake actuator moves in a predetermined manner as established by respective said first sensor means, first alarm circuit means having an alarm within a driver's compartment of a vehicle operably connected to both said first sensor means and responsive to said first output signal for providing a first alarm output signal in response to either of said first output signals, second sensor means responsive to the air pressure in one said parking brake actuator for providing a second output signal when the air pressure in said one parking brake actuator is less than a first value as established by said second sensor means each said first sensor means including first and second contact means, one said contact means being operably connected to a first component of the respective said parking brake actuator that is movable when the said parking brake actuator is operated to operate a corresponding said parking brake, each said first sensor means further including first electric circuit means for providing said first output signal in response to opening between said first and second contacts said one contact means being affixed to the first component, said first component being movable in response to movement of a diaphragm of the respective said parking brake actuator that is movable in a first direction a first predetermined distance by the force applied thereto by a spring means of said parking brake actuator to set a corresponding said parking brake and movable in a second direction a second predetermined distance by air pressure to release a corresponding said parking brake, said first and second contact means being in contact when the respective said parking brake actuator is operated to release a parking brake, said contact means being opened when air pressure applied to said diaphragm is insufficient to overcome the force applied thereto by said spring means thereby resulting in movement of said diaphragm, in response to said spring means, a distance less than said first predetermined distance.

* * * * *